Figure 1:
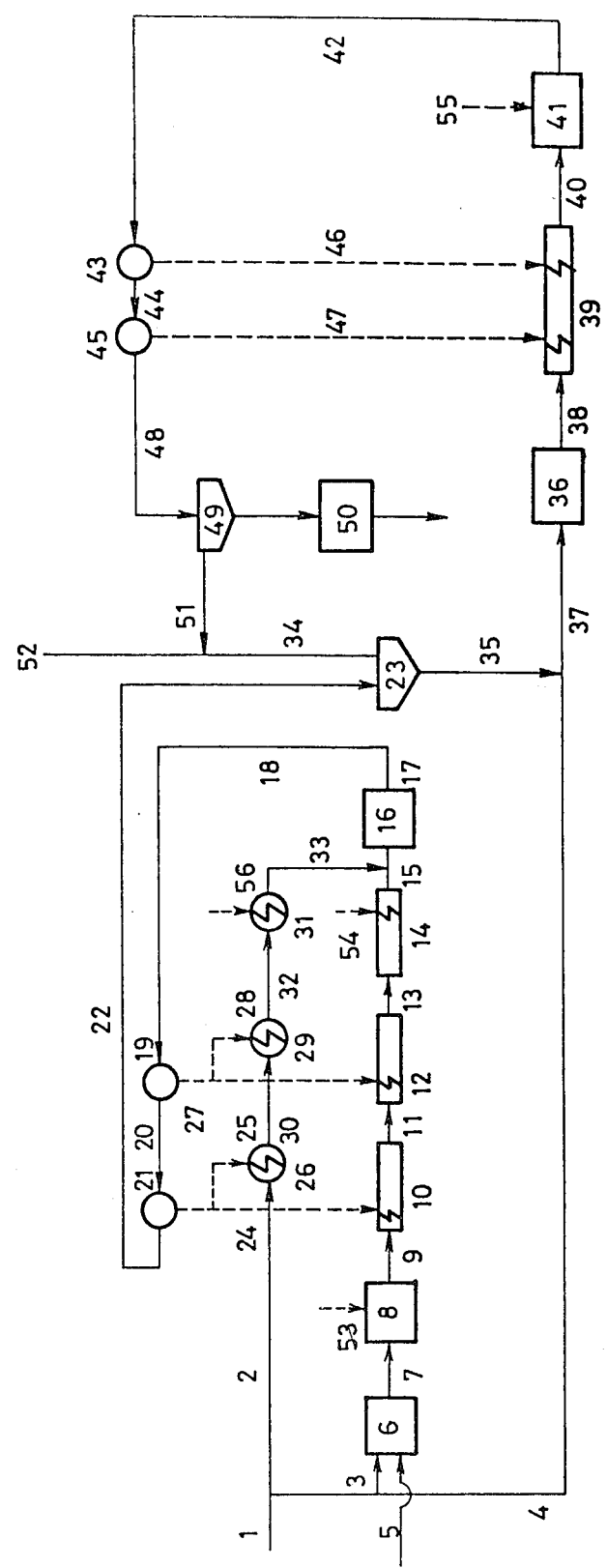

United States Patent [19]

Yamada et al.

[11] 4,426,363

[45] Jan. 17, 1984

[54] PROCESS FOR EXTRACTING ALUMINA FROM ALUMINOUS ORES

[75] Inventors: Koichi Yamada; Takuo Harato; Hisakatsu Kato; Yasumi Shiozaki, all of Niihama, Japan

[73] Assignee: Sumitomo Aluminium Smelting Company, Ltd., Osaka, Japan

[21] Appl. No.: 349,666

[22] Filed: Feb. 17, 1982

[30] Foreign Application Priority Data

Feb. 27, 1981 [JP] Japan .................. 56/29154

[51] Int. Cl.$^3$ .............................. C01F 7/06
[52] U.S. Cl. ..................... 423/121; 423/119
[58] Field of Search ................ 423/119, 121

[56] References Cited

U.S. PATENT DOCUMENTS 4,324,769   4/1982   McDaniel ................. 423/121

FOREIGN PATENT DOCUMENTS 269395   6/1964   Australia ..................... 423/121
289232  12/1965   Australia ..................... 423/121
50-20040 11/1975  Japan .
56-6160321 12/1981 Japan ......................... 423/121
1145105   3/1969   United Kingdom ........ 423/121

*Primary Examiner*—Herbert T. Carter
*Attorney, Agent, or Firm*—Wenderoth, Lind & Ponack

[57] ABSTRACT

In the production of alumina from aluminous ores containing alumina trihydrate and alumina monohydrate comprising a first-stage digestion by digesting alumina trihydrate from a slurry of the ores and a caustic solution and separating the resulting slurry into a caustic aluminate solution and an insoluble residue, and a second-stage digestion by digesting alumina monohydrate from a slurry of the insoluble residue separated in the first-stage digestion and a caustic solution, the present invention provides an improvement wherein scale formation onto a preheater for the slurry in the second-stage digestion is completely or substantially prevented and reduction in heat transfer coefficient of heat transfer surface is remarkably lowered. The improvement is attained by setting up a desilication reaction zone in the course of the first-stage digestion, whereby the slurry introduced into said zone is subjected to desilication reaction treatment.

2 Claims, 1 Drawing Figure

PROCESS FOR EXTRACTING ALUMINA FROM ALUMINOUS ORES

The present invention relates to a process for extracting alumina by digesting aluminous ores containing mixtures of alumina trihydrate (gibbsite) and alumina monohydrate (boehmite) (hereinafter referred to as "mixed bauxite") with a caustic solution. More particularly, it relates to an improvement of the so-called two-stage digestion for extracting alumina from a mixed bauxite by combining two unit digestion processes, that is, a digestion process for alumina trihydrate (hereinafter referred to as "first-stage digestion") and the other for alumina monohydrate (hereinafter referred to as "second-stage digestion") wherein formation and deposition of scales on the inside surface of a preheating zone having an indirect heating device in the second-stage digestion is completely or substantially prevented and in addition thermal efficiency is very superior.

As is well known, in a process for extracting alumina from aluminous ores, when the ores contain substantially all of the available alumina in the form of alumina trihydrate, digestion treatment can be carried out under mild conditions since alumina trihydrate (hereinafter referred to as "trihydrate") dissolves in a caustic solution with high solubility and quite rapidly.

Contrary to this, since alumina monohydrate (hereinafter referred to as "monohydrate") dissolves in a caustic solution with low solubility and slowly as compared with trihydrate, severe conditions of high temperature and pressure are necessary for digesting aluminous ores containing the available alumina in the form of alumina monohydrate.

Consequently, the following two processes are in use for extracting alumina by digesting a mixed bauxite:

(1) A process in which digestion of both mono- and tri-hydrates is carried out under digestion conditions suitable for monohydrate-containing ores, and (2) a process in which trihydrate is first digested from a mixed bauxite under digestion conditions suitable for trihydrate-containing ores and then the insoluble residue is treated under a digestion condition suitable for monohydrate-containing ores.

In the former process (1), a mixed bauxite containing both mono- and tri-hydrate is treated under a single and severe condition of high temperature and pressure employed suitably for digestion of monohydrate. Consequently, the capital cost of plant installment is expensive and the heat quantity consumed is high. Also the circulated amount of caustic aluminate solution discharged from a digester is much more than in the latter process (2). This results necessarily in the alumina content extracted in the caustic solution being low. For this reason, the decomposition efficiency of caustic aluminate solution in the subsequent precipitation step of aluminium hydroxide becomes low. Therefore, the former process (1) does not sufficiently utilize to advantage the presence of trihydrate in the mixed bauxite.

While the latter process (2), well known as the so-called two-stage digestion, is a digestion process for extracting alumina from a mixed bauxite which combines separately the respective digestion conditions of the two alumina hydrates, it is economical as compared with the former process (1). The well known processes in the two-stage digestion are disclosed, for example, in Japanese Patent Publication Nos. 5804/1963 and 5805/1963, Japanese Patent Publication (Unexamined) No. 86499/1975, U.S. Pat. No. 2,701,751 and the like. However, in these digestion processes no means is provided to prevent formation and deposition of scales on the inside surface, that is, on the heat transfer surface of a preheating zone having an indirect heating device, so that the heat transfer coefficient of said surface is markedly lowered. Therefore, these known processes have great disadvantages in that much labor and expense is required for removal of the scale and, in addition, continuous operation is disturbed.

Generally, in a preheating zone for a slurry of aluminous ores and a caustic solution, silica in the ores dissolves in the caustic solution during preheating and then chemically combines with the alkali metal and alumina present in the solution to form an insoluble, complex sodium aluminium silicate. A portion of this complex silicate deposits as scale on the heat transfer surface of a preheating zone to lower rapidly the heat transfer coefficient of the surface. Consequently, a preheating zone, particularly its heat transfer surface, should be designed with allowance for reduction in heat transfer coefficient, or the scale deposited on the inside surface of said preheating zone should be removed with increased frequency. This requires great expense for scale removal or countermeasures to the pressure of scale. Because of this, a method for decreasing formation and deposition of scale in a preheating zone and a digesting zone is disclosed in U.S. Pat. No. 3,413,087. In this method, the scale formation is decreased by mixing aluminous ores with a caustic alkali solution which is insufficient to dissolve all the soluble alumina, but sufficient to dissolve substantially all the silica present in said ores to prepare a thick slurry, and then maintaining the slurry in a predigestion stage at a temperature of about 70° to about 250° C., that is, carrying out the so-called preliminary desilication, to deposit silica as the desilication product. Said preliminary desilication is useful in the one-stage digestion of mixed bauxite, that is, in a process wherein mixed bauxite is mixed with a caustic solution to prepare a slurry which is then digested under the digestion condition suitable for monohydrate.

Hereupon, the present inventors intended to develop a process for extraction of alumina from mixed bauxite which is more economical and capable of sufficiently displaying the advantages of the two-stage digestion, particularly a process in which the first-stage digestion for digesting trihydrate from mixed bauxite is carried out according to the so-called two-stream system, and also in which a tubular reactor of high thermal efficiency is used in each preheating zone of the two-stage digestion. In this development, the preliminary desilication disclosed in the foresaid U.S. Pat. No. 3,413,087 was tried in order to prevent the scale formation in the preheating zone of the first- and second-stage digestions. However, the inventors encountered a disadvantage that the continuous operation became difficult due to the formation and deposition of large amounts of scale inside the preheating zone in the second-stage digestion for digestion of monohydrate.

For this reason, in the two-stage digestion of mixed bauxite, the present inventors extensively studied to establish a process for obtaining alumina more economically by preventing scale formation on the inside surface of the preheating zone in the second-stage digestion. As a result, the inventors found the following: In the first-stage digestion, when trihydrate is digested from mixed bauxite by employing the two-stream system and by using a tubular preheater as the preheating zone, the scale formation inside the preheating zone in the subsequent second-stage digestion can be prevented by setting up a desilication zone at a proper site between an inlet part of the preheating zone into which the slurry prepared from a caustic solution and mixed bauxite is introduced, and a separation zone wherein the slurry, after digestion of trihydrate, is separated into a caustic aluminate solution and an insoluble mud containing monohydrate, whereby the slurry introduced into the desilication zone is subjected to desilication reaction treatment. The present invention was completed on this finding.

That is, the present invention provides a process for extracting alumina from a mixed bauxite which comprises the steps of:

(a) a first-stage digestion by introducing a slurry of mixed bauxite and a portion of caustic solution into a tubular preheater, preheating individually said slurry and the other portion of caustic solution each in preheaters according to a two-stream system, mixing the preheated slurry with the preheated caustic solution, digesting alumina trihydrate from mixed bauxite and separating the digested slurry into a caustic aluminate solution and an insoluble mud containing alumina monohydrate, and (b) a second-stage digestion by preparing a slurry of said insoluble mud containing alumina monohydrate separated in the first-stage digestion and a caustic solution, preheating the resulting slurry and digesting alumina monohydrate from the preheated slurry, wherein an improvement comprises setting up a desilication reaction zone in the first-stage digestion at a site between an inlet part of the tubular preheater into which the slurry of mixed bauxite and a portion of caustic solution is introduced, and said separation zone, whereby the slurry introduced into the desilication reaction zone is subjected to desilication reaction treatment.

The present invention will be illustrated in detail below.

For digestion of trihydrate from aluminous ores containing trihydrate with a tubular preheater, two systems, the one-stream system and the two-stream system, are known. In the former system, for example, the ores are mixed with the amount of caustic solution which is sufficient to dissolve all the soluble trihydrate from the ores and the resulting slurry is followed by preheating and digesting. In the other system, a slurry of ores and a portion of caustic solution, and the remaining caustic solution are individually preheated and then mixed to carry out extraction of alumina. The present invention employs the latter two-stream system for digesting trihydrate from mixed bauxite because it is superior in construction cost of plant, steam balance and prevention of scale formation.

Digestion of monohydrate requires severe conditions as compared with that of trihydrate, so that an autoclave-type heat exchanger, a tubular-type heat exchanger, etc., are used as a preheater for a slurry of monohydrate-containing ores and a caustic solution. Also, as digestion system of monohydrate, any of the one-stream system and the two-stream system may be used, but the one-stream system for digestion of monohydrate using a tubular-type preheater for preheating and autoclave-type digester being capable to inject live steam is more economical, considering the digestion condition for monohydrate. The description given below is therefore based on the one-stream system for digestion of monohydrate. However, the present invention is also possible to employ the two-stream system for digestion of monohydrate from mixed bauxite.

In the first-stage digestion of the present invention, the two-stream system for preheating a slurry of mixed bauxite and a portion of caustic solution, and the remaining of caustic solution is employed, for the reason that this system is economical since the time required for preheating can be shortened and heating can be achieved with good thermal efficiency.

In the present invention, the two-stream system for preheating a slurry of mixed bauxite and caustic solution in the first-stage digestion it is proper to employ the well known processes commonly used for extraction of alumina from the trihydrate-containing ores. A caustic solution for digestion of trihydrate such as a caustic soda solution, a mixed solution of caustic soda and sodium carbonate, or a recycled caustic aluminate solution in the Bayer process (hereinafter referred to as "spent liquor") is divided into a main stream and a side stream, generally in a ratio of 60 to 95 wt %:40 to 5 wt %. The main stream is preheated to a temperature near the digestion temperature of trihydrate (usually about 110° C. to 180° C.) with steam recovered from a flash tank for cooling the slurry resulting from digestion of trihydrate, whereas the side stream is mixed with mixed bauxite as a starting material to obtain a slurry whose solid concentration may be about 20 to about 50% by weight, and the resulting slurry is introduced into a tubular preheater for the first-stage digestion, preheated successively by recovered steam in the same manner as the preheating of the main stream and then mixed with said preheated main stream to digest trihydrate from mixed bauxite.

Prior to digestion of trihydrate, it is effective to employ a so-called preliminary desilication for the slurry consisting of mixed bauxite and the side stream of caustic solution, because the slurry is so high in solid content that reactive silica in mixed bauxite dissolves in the caustic solution during preheating in the first-stage digestion to form scales, i.e., desilication products, which deposit on and attach to the heat transfer surface of tubular preheater, thereby sometimes lowering the heat transfer coefficient to a large extent.

The preliminary desilication is carried out by firstly mixing mixed bauxite with an amount of caustic solution which is insufficient to dissolve all the soluble trihydrate, but sufficient to dissolve substantially all the reactive silica present in mixed bauxite, and maintaining the adjusted slurry at a temperature of about 70° C. or higher, preferably about 80° C. to not higher than its boiling point under atmospheric pressure for about 30 minutes or more, generally 0.5 to 12 hours.

As a heat source for the preliminary desilication, the foresaid recovered steam from a flash tank for cooling the slurry after digestion may be used, and of course, steam from outside the system may also be used. The heating for desilication may be any of direct injection of steam and indirect heating with steam.

In the present invention, the slurry subjected to the preliminary desilication, or the slurry prepared by adjusting mixed bauxite and the side stream of caustic solution without the preliminary desilication, is introduced into a tubular preheater such as a double tube-type heat exchanger, a shell-and-tube type heat exchanger, etc. of indirect heating, and preheated to a temperature at which trihydrate can be digested from the slurry, generally to about 110° C. or higher, preferably 130° to 180° C.

The main stream of caustic solution is preheated to a temperature near the digestion temperature of trihydrate, for example, by means of a double-tube type, shell-and-tube type heat exchanger or the like, by the well known method as described above, that is, by the use of recovered steam from a flash tank for cooling the slurry after digestion or by steam from outside the system.

The desilication reaction treatment of the present invention may be applied at an optional stage after the slurry, as prepared from mixed bauxite and all or a portion of a required amount of caustic solution, which is in the course of the first stage digestion for digesting trihydrate from mixed bauxite, has reached a temperature suitable for the intended desilication. Concretely, for example, the preheated main stream of caustic solution and slurry, separately or after being mixed, are introduced into a desilication reaction zone for the completion of desilication reaction treatment and digestion of trihydrate at the same time, or the preheated slurry passed through the tubular preheater is introduced into the desilication reaction zone to complete the desilication reaction and then mixed with the preheated main stream to substantially complete digestion of trihydrate.

In the present invention, the desilication reaction treatment is carried out at a temperature of generally about 130° to about 180° C. corresponding to the digestion temperature of trihydrate, preferably about 140° to about 170° C. When the temperature is too low, a long period of retention time or a large-sized retention zone for the desilication reaction is necessary, and also there occurs a problem of the intended desilication reaction product being not formed. When the temperature is too high, the quantity of heat required necessarily increases, a large amount of steam is required and the installation of a heat exchanger having a large surface area available for heat transfer is necessary, which is disadvantageous in terms of economy. Therefore, it is suitable that the upper limit of the desilication temperature is the temperature that has been determined as the digestion temperature of trihydrate.

The retention time of the slurry maintained in the desilication reaction zone varies with the silica content in the slurry and the desilication temperature, so that it is not critical. Generally, however, periods of about 10 minutes or more, preferably 20 to 120 minutes are maintained in the range of foresaid desilication temperature.

In the two-stage digestion for extracting alumina from mixed bauxite, the present inventors found that the formation and deposition of scale in the second-stage digestion, i.e., on the preheating and digesting zone for extraction of alumina from monohydrate-containing ores, particularly on the inside surface of the preheating zone, depends upon the structure of desilication reaction products formed by the desilication reaction treatment. As the structure of desilication product, both a low-temperature desilication product composed mainly of $3SiO_2.1.5 \sim 1.7 \ Na_2O.1.7 \sim 2.2 \ Al_2O_3$ and a high-temperature desilication product composed mainly of $3SiO_2.1.9 \sim 2.3 \ Na_2O.1.6 \sim 1.9 \ Al_2O_3$ are usually present. When the desilication product in the slurry after the desilication treatment is the low-temperature desilication product, for example, as formed by the so-called preliminary desilication, it redissolves in the preheated caustic solution during the procedure of preheating to reprecipitate on the inside surface of preheating and digesting zone in a different deposition form such as the high-temperature desilication product. While, when the desilication product is precipitated in the desilication reaction zone in the form of the high-temperature desilication product, such phenomenon, i.e. re-dissolution of said desilication product in the preheating and digesting zones for monohydrate, is not observed.

In the present invention, the desilication reaction treatment of the slurry in the course of preheating or after digesting trihydrate, is carried out with an object of converting the low-temperature desilication product into the high-temperature desilication product or converting reactive silica to the high-temperature desilication product through the precipitation by setting up the desilication reaction zone in the first-stage digestion, whereby, in digestion of trihydrate from mixed bauxite, the retention time of the slurry within the temperature region suitable for the desilication reaction treatment is prolonged.

It is preferred that most of the desilication reaction products contained in the slurry after desilication reaction treatment have the structure of high-temperature desilication product in order to prevent scale formation in the preheating and digesting zones for monohydrate. It is sufficient, however, that generally 50 wt % or more, preferably 70 wt % or more, more preferably 80 wt % or more of desilication reaction products is precipitated in the form of high-temperature desilication product.

The structure of deposition products produced by the desilication reaction treatment varies with the temperature of desilication reaction treatment, the retention time of the slurry, silica content in the slurry and the like and therefore, in a commercial process, it is suitable to set up the optimum desilication reaction conditions by the identification of desilication products contained in the mud after desilication treatment by means of X-rays analysis, chemical analysis or both.

The reaction vessel suitable for the desilication reaction treatment includes for example a pressure vessel with or without a stirrer and the like. Since the desilication reaction is substantially carried out in the reaction vessel for desilication, the desirable form of the vessel is a heat-insulated vessel having no heat transfer surface. If necessary, however, a reaction vessel having such means that heat can be supplied by injecting directly live steam or by heating indirectly, may also be used. For heating the slurry to a temperature suitable for desilication, the following methods may be used: Both the main stream of caustic solution and the slurry based on the two-stream system are sufficiently heated at the respective preheating steps and then mixed to maintain the mixed slurry at the desilication temperature; both the main stream and the slurry are individually preheated to a temperature near the desilication temperature, mixed, heated further to the desilication temperature and maintained at the same temperature; or the slurry to be preheated by the two-stream system is heated to a temperature suitable for desilication and then introduced into the desilication reaction zone.

After the desilication reaction treatment has been finished as described above and also digestion of trihydrate from mixed bauxite has been substantially completed, the slurry is then separated, by the solid-liquid separation means, mainly into the caustic aluminate solution resulting from digestion of trihydrate, usually sodium aluminate solution, and an insoluble mud containing desilication reaction products and alumina monohydrate.

The mud thus separated is supplied to the second stage digestion, i.e. treatment for digestion of monohydrate. That is, the mud is slurried with a caustic solution such as the spent liquor, and the resulting slurry is introduced into a tubular preheater such as a double-tube type heat exchanger, shell-and-tube type heat exchanger and the like to preheat to a temperature near the digestion temperature of monohydrate, usually about 170° C. or higher. Then, the preheated slurry is introduced into a digester maintained at a temperature of about 200° C. or higher to complete digestion of monohydrate remaining in the slurry. The temperature for digestion of monohydrate is usually about 200° to about 300° C. For a digester it is proper to use a tubular digester such as a double-tube type, shell-and-tube type and the like and a reaction vessel of or heat-insulate type such as an autoclave.

The spent liquor used for digestion of mixed bauxite is a caustic solution circulating through the Bayer process and is properly used in two portions, a portion for digestion of trihydrate and the other portion for digestion of monohydrate. The division ratio of the spent liquor is not critical and determined depending upon the trihydrate and monohydrate content of mixed bauxite used as starting material.

The slurry withdrawn from the digester of monohydrate is treated according to an alumina production procedure by the so-called Bayer process.

The present invention, as described in detail above, proves a process for extracting alumina by digesting mixed bauxite containing trihydrate and monohydrate, which is very useful from the commercial point of view because, as compared with the well known two-stage digestion processes, it is simple in process, capable of completely or substantially preventing formation of scale on the inside surface of the equipment in the preheating and digestion treatment, effective in thermal efficiency and cheap in construction cost.

Next, the present invention will be described in more detail with reference to the accompanying drawing, but will not be limited to the drawing.

FIG. 1 is a flow sheet showing one embodiment of the present invention.

In FIG. 1, a caustic solution or a spent liquor introduced through line 1 is divided into a main stream (line 2) and a side stream (line 3) for digestion of trihydrate based on the two-stream system, and the remaining portion (line 4) to be supplied to the stage for digestion of monohydrate. The side stream through line 3 is the amount of caustic solution which is insufficient to dissolve all trihydrate from mixed bauxite, but sufficient to dissolve substantially all reactive silica therefrom, and it is mixed in a slurry preparation tank 6 with mixed bauxite through line 5 to prepare a flowable slurry. The slurry thus prepared is introduced through line 7 into a preliminary desilication vessel 8 wherein the slurry is heated by heat through line 53 to a temperature of about 70° C. or higher, preferably about 80° C. to a boiling point of the slurry and maintained until soluble silica present in the slurry is converted to a desilication product of predetermined amounts.

It is generally sufficient to carry out the preliminary desilication until the degree of desilication reaches approximately 90% or less, and the degree of desilication of about 50 to about 80% is particularly economical and also effective since long periods of retention time for the preliminary desilication are not required. The rate of reaction on the preliminary desilication is determined by the rate at which the silica dissolves out of bauxite, so that, when the caustic solution is used in amounts described above, extremely long period of time is necessary for substantially completing desilication reaction. However, in the present invention the desilication treatment is carried out on the slurry in the course of preheating or after digestion of trihydrate, so as to allow silica or the low-temperature desilication product present in the slurry to precipitate as or convert into the high-temperature desilication product. In the preliminary desilication, therefore, it is sufficient to treat easily soluble silica alone having such a relatively high rate of desilication reaction as to dissolve out under the digestion condition for trihydrate.

The slurry after the preliminary desilication is supplied to a tubular reactor 10 for preheating and digesting in the first-stage digestion through line 9, and then to a tubular reactor 12 through line 11. Into the tubular reactors is introduced through lines 24 and 27, respectively, recovered steam from flash tanks 21 and 19 for cooling the slurry after trihydrate of digestion, respectively. Thus, the slurry is successively preheated, and when heat quantity is not enough for digestion of trihydrate, the slurry is further introduced through line 13 into a tubular reactor 14 wherein it is preheated, by injecting live steam or indirect heating through line 54 to a temperature of 110° to 180° C. which is the digestion temperature of trihydrate to carry out digestion of trihydrate from the slurry. The slurry after preheating in tubular reactors 10, 12 and 14 is then supplied through line 15 to a desilication reaction vessel 16. While the main stream through line 2 is successively preheated by heat exchangers 26 and then 29, to which recovered heat is suppied through lines 25 and 28, respectively, from flash tanks 21 and 19, respectively. If necessary, the preheated mainstream is introduced through line 32 into a heat exchanger 31 wherein it is further preheated to a predetermined temperature by injecting live steam through line 56. Then the preheated main stream is supplied through line 33 to the desilication reaction vessel 16 wherein it is mixed with the preheated slurry to prepare a slurry consisting of mixed bauxite and the amount of caustic solution which is sufficient to dissolve all trihydrate present in mixed bauxite. The slurry thus prepared is kept as it is whereby the desilication rection treatment is carried out to complete precipitation of the high-temperature desilication product and at the same time digestion of trihydrate.

The slurry after the desilication reaction treatment and digestion of trihydrate is withdrawn through line 17 and sent to a solid-liquid separator 23 through lines 18, 20 and 22, during which the slurry is cooled by flash tanks 19 and 21. Recovered steam from flash tanks 19 and 21 is generally used as heat source for preheating the main stream of caustic solution and the slurry of mixed bauxite and the side stream.

The slurry introduced into the solid-liquid separatior 23 through line 22 is separated into a caustic aluminate solution, usually sodium aluminate solution, resulting from digestion of trihydrate and an insoluble mud containing desilication reaction products and monohyrate. The sodium aluminate solution is sent to a precipitation step for aluminium hydroxide (not shown) through lines 34 and 52, and the mud is sent through lines 35 and 37 to a slurry preparation vessel 36 for digestion of monohydrate in the second-stage digestion.

In said vessel 36, the mud containing monohydrate is mixed with caustic solution through line 4 to prepare a slurry containing the amount of caustic solution which is sufficient to dissolve all monohydrate and which is flowable. Thereafter, the slurry is supplied through line 38 to a tubular preheater 39 wherein it is preheated to a temperature near the digestion temperature of monohydrate, generally about 200 C. or higher. As a heat source for the tubular preheater 39, recovered steam from flash tanks 43 and 45 is supplied thereto through lines 46 and 47.

The preheated slurry passed through the preheater 39 is supplied through line 40 to a digester 41 which is generally a high pressure reaction vessel, such as single-tube type or shell-and-tube type tubular reactor and autoclave wherein the slurry is held for a period of time necessary to complete substantially digestion of alumina component, mainly monohydrate, remaining in the insoluble residue of the first-stage digestion. In the Figure, a vessel-type pressure digester is exemplified and live steam as heat source is injected through line 55 into said digester 41. But a series of tubular digesters may also be used successfully for digestion of monohydrate.

The slurry after digested in the digester 41 is withdrawn through line 42 and sent to the next step through lines 44 and 48, during which it is cooled by flash tanks 43 and 45. Recovered steam from flash tanks 43 and 45 is generally used as heat source for preheating the slurry. The cooled slurry is sent through line 48 to a blow-off tank (not shown) wherein the pressure of the system is reduced to atmospheric pressure. Thereafter, the slurry is introduced into a solid-liquid separator 49 wherein the slurry is separated into an insoluble residue and a caustic aluminate solution, usually sodium aluminate solution. The caustic aluminate solution is supplied through lines 51 and 52 to the precipitation step (not shown) like the caustic aluminate solution obtained by digestion of trihydrate. At the precipitation step, the caustic aluminate solution is treated as usual to precipitate aluminium hydroxide which is then separated and calcined to produce alumina as product. The spent liquor freed from aluminium hydroxide, if desired, after concentration or supplement of necessary amount of caustic soda, is circulated to line 1.

The insoluble residue separated at the separator 49 is sent to a washing step 50, and after recovery of available components, it is discharged.

In the foresaid explanation, the specified numbers of flash tanks for cooling and the specified numbers of preheaters for the main stream of caustic solution and the slurry are shown, but any desired number of flash tanks and preheaters can be, of course, employed.

In the two-stage digestion of mixed bauxite, the present invention described above in detail succeeded, in the second-stage digestion, in completely or substantially preventing formation of scale, i.e. scale of desilication products, on the inside surface of preheating zone for digestion of monohydrate, by improving the first-stage digestion for digestion of trihydrate from mixed bauxite based on the two-stream system, that is, by using a tubular preheater for the purpose of preheating and digesting the slurry consisting of mixed bauxite and the caustic solution or the side stream of spent liquor, and in addition carrying out the desilication reaction treatment on the slurry in the course of preheating or after digestion, thereby converting reactive silica in the slurry into precipitation of the high-temperature desilication product. Thus, the present invention attains remarkable improvement in steam consumption and reduction in such labor and expenses required for scale removal. This brings about remarkable commercial advantages.

Now, the present invention will be described in further detail by way of Example, but will not be restricted to this Example.

EXAMPLE

The two-stage digestion of mixed bauxite was carried out according to the flow sheet in FIG. 1.

Circulating spent liquor having a $SiO_2$ concentration of 0.39 g/l, a $Na_2O$ concentration of 122 g/l and an $Al_2O_3$ concentration of 74.5 g/l supplied through line 1 was divided into 87 parts by weight of digestion of trihydrate and 13 parts by weight for digestion of monohydrate. Further, in digestion of trihydrate (the first-stage digestion) based on the two-stream system, a main stream corresponding to 77 wt % of the spent liquor earlier divided for digestion of trihydrate was sent through line 2 to shell-and-tube type heat exchangers 26, 29 and then 31 wherein the main stream was preheated to 161° C.

A side stream corresponding to 23 wt % of said spent liquor was supplied through line 3 to slurry preparation tank 6 wherein it was mixed with mixed bauxite, trihydrate content being 42 wt %, monohydrate 4 wt %, reactive silica, 2.15 wt % and quartz 0.35 wt %, supplied through line 5 to adjust flowable slurry.

The slurry thus prepared was introduced through line 7 into preliminary desilication vessel 8 wherein the slurry was kept at a temperature of 90° C. for 4 hours by introducing recovered steam through line 53 to carry out preliminary desilication, said recovered steam being recovered from flash tanks for cooling the slurry resulting from digestion of trihydrate.

The slurry after preliminary desilication was introduced through line 9 into a series of tubular reactors 10 and 12 of double-tube type heat exchanger wherein the slurry was preheated to 125° C. by said recovered steam, and then after being preheated at 160° C. in tubular preheater 14 by injecting directly live steam supplied through line 54, was supplied through line 15 to desilication reaction vessel 16 for desilication reaction treatment. Into the vessel 16 was also introduced the main stream of caustic solution preheated with recovered steam and directly injected live steam according to the two-stream system, and mixed with the preheated slurry. The mixture obtained was maintained at 150°–160° C. for 30 minutes in the vessel 16 to carry out the objective desilication reaction treatment.

The liquid phase of the slurry after desilication reaction treatment had a composition comprising 116 g/l of $Na_2O$, 141 g/l of $Al_2O_3$ and 0.47 g/l of $SiO_2$, while analysis of desilication reaction products in the insoluble mud showed that approximately 100% of the products converted into or precipitated as the high-temperature desilication product.

The slurry, after desilication reaction treatment and at the same time digestion of trihydrate, was introduced in series through lines 17 and 18 into flash tanks 19 and 20 for cooling the resulting slurry, and after being cooled to 105° C., the cooled slurry was sent to solid-liquid separator 23 through line 22 wherein it was separated into solid and liquid. The liquid, sodium aluminate solution, was sent to the precipitation step (not shown) through line 34 and 52, and on the other hand the insoluble residue, mud (slurry concentration, about 360 g/l), was sent to slurry preparation vessel 36 through lines 35 and 37.

To the vessel 36 was supplied a required amount of spent liquor through lines 4 and 37, and mixed with the mud to prepare the slurry. The slurry was then sent through line 38 to slurry preheater 39 of shell-and-tube type heat exchanger wherein it was preheated to about 200° C. with steam recovered from flash tanks 43 and 45 for cooling the resulting slurry after digestion of monohydrate. The preheated slurry was introduced through line 40 into digester 41 of cylindrical pressure reaction vessel with a stirrer. Into the digester 41, live steam was injected directly through line 55 to heat the slurry at a temperature of 220° C., and the slurry was held for 20 minutes to effect digestion of monohydrate.

The slurry after digestion of monohydrate was withdrawn through line 42 to send to flash tanks 43 and 45 for cooling the resulting slurry, and after cooling, the cooled slurry was sent to solid-liquid separator 49 through line 48 wherein it was separated into solid phase and liquid phase. The liquid phase, sodium aluminate solution, was sent to precipitation step of aluminum hydroxide through line 51, and the solid residue, the so-called red mud, was sent to the red mud washing step 50.

In the present invention, the liquid phase of the slurry in the course of passing through slurry preheater 39 in the second-stage digestion had a $SiO_2$ concentration of 0.44 g/l or less for a temperature range of 180° C. or lower, and 0.46 g/l or less for a temperature range of higher than 180° C. In the result, scale formation on the inner surface of slurry preheater 39 and reduction in heat transfer coefficient was not substantially observed even after 12 months' continuous operation.

For comparison, digestion of trihydrate was carried out in the same manner as above except that, in one run, the desilication reaction zone was not set up, and in another run, said zone was set up but the retention time for desilication reaction treatment was 20, 15 and 7 minutes. In either run, the liquid phase of the slurry after digestion of trihydrate has a $SiO_2$ concentration of 0.47 g/l which was the same as in the foregoing Example.

But when treatments after digestion of trihydrate, i.e. solid-liquid separation, mixing and adjusting of separated mud with spent liquor, preheating of the resulting slurry and digestion of monohydrate, were applied under the same conditions as in the Example to these slurries after digestion of trihydrate, the silica concentration of the liquid phase in slurry preheater 39 in the second-stage digestion was shown in Table 1 at the 180° C.-region of said preheater.

Additionally, in Table 1 is shown together periods of time required for the overall heat transfer coefficient of heat transfer surface to lower from 1200 Kcal/m².hr.°C. to 850 Kcal/m².hr.°C. and analytical results on desilication reaction products deposited on the desilication reaction zone.

What is claimed is:

1. In a process for extracting alumina from aluminous ores containing mixtures of alumina trihydrate and alumina monohydrate which comprises the steps of: (a) a first-stage digestion by introducing a slurry of said ores and a portion of caustic solution into a tubular preheater, preheating individually the slurry and the other portion of caustic solution each in preheaters according to a two-stream system, mixing the preheated slurry with the preheated caustic solution, digesting alumina trihydrate from the ores and separating the slurry resulting after digestion of trihydrate into a caustic aluminate solution and an insoluble mud containing alumina monohydrate, and (b) a second-stage digestion by preparing a slurry of said insoluble mud containing alumina monohydrate separated in the first-stage digestion and a caustic solution, preheating the resulting slurry and digesting alumina monohydrate from the preheated slurry, the improvement wherein a desilication reaction zone is established in the first-stage digestion at a location following the inlet portion of the tubular preheater into which the slurry of said ores and a portion of caustic solution is introduced and before the step of separating the said slurry into caustic aluminate solution and insoluble mud, and carrying out the desilication reaction in said desilication reaction zone at a temperature of from about 130° C. to about 180° C. at a rentention time in said desilication reaction zone of from 20 to 120 minutes so that at least 50 weight % of reactive silica in the ores is converted into or deposited as a high-temperature desilication reaction product.

2. The process according to claim 6, additionally comprising subjecting the slurry of said ores and a portion of caustic solution in the first-stage digestion to a preliminary desilication treatment before preheating.

* * * * *

UNITED STATES PATENT AND TRADEMARK OFFICE
CERTIFICATE OF CORRECTION

PATENT NO. : 4,426,363

DATED : January 17, 1984

INVENTOR(S) : KOICHI YAMADA; TAKUO HARATO; HISAKATSU KATO; YASUMI SHIOZAKI

It is certified that error appears in the above-identified patent and that said Letters Patent is hereby corrected as shown below:

Column 12, immediately following line 11, insert the following:

-- Table 1

| Desilication reaction time (retention time) | Form of desilication product (percentage of high-temperature desilication product contained) | $SiO_2$ concentration of liquor (g/l) | Number of days required for reduction of heat transfer coefficient |
|---|---|---|---|
| 30 minutes | 100 % | 0.44 | More than 1 year |
| 20 minutes | 80 % | 0.47 | 7 months |
| 15 minutes | 50 % | 0.74 | 3 months |
| 7 minutes | 20 % | 0.91 | 30 days |
| None | 2 % | 1.03 | 20 days |

As clearly shown from these results, the present invention, in which desilication reaction treatment is carried out by setting up a desilication reaction zone in the course of digestion of trihydrate, in the first-stage digestion, and retaining for a period of time in said zone, is superior in the following respects to the conventional known processes having no desilication reaction zone:

UNITED STATES PATENT AND TRADEMARK OFFICE
CERTIFICATE OF CORRECTION

PATENT NO. : 4,426,363

DATED : January 17, 1984

INVENTOR(S) : KOICHI YAMADA; TAKUO HARATO; HISAKATSU KATO; YASUMI SHIOZAKI

It is certified that error appears in the above-identified patent and that said Letters Patent is hereby corrected as shown below:

Scale formation on the inside surface of a preheater for digestion of monohydrate is remarkably reduced; and also the larger the degree of the formation of the high temperature desilication product converted by the desilication treatment, the less the scale formation and the less the reduction in heat transfer coefficient of the heat transfer surface.--

Signed and Sealed this

Twenty-third Day of October 1984

[SEAL]

Attest:

GERALD J. MOSSINGHOFF

Attesting Officer

Commissioner of Patents and Trademarks